United States Patent [19]

Hon

[11] Patent Number: 4,848,387
[45] Date of Patent: Jul. 18, 1989

[54] METHOD AND APPARATUS FOR SEGREGATED INTRODUCTION OF TWO LIQUIDS INTO A CHEMICAL REACTOR VESSEL AT A COMMON ENTRY POINT

[75] Inventor: Clarence C. Hon, Cherry Hill, N.J.

[73] Assignee: Mobil Oil Corporation, New York, N.Y.

[21] Appl. No.: 99,851

[22] Filed: Sep. 22, 1987

[51] Int. Cl.[4] ............................................ F16K 11/22
[52] U.S. Cl. ........................................ 137/1; 137/592; 137/606; 141/104; 141/105; 422/129; 422/131
[58] Field of Search ................... 137/590, 592, 212, 1, 137/594, 595, 606; 141/104, 105; 422/129, 131

[56] References Cited

U.S. PATENT DOCUMENTS

| | | |
|---|---|---|
| 142,120 | 8/1873 | Richardson . |
| 173,160 | 2/1876 | Class ................................ 137/212 X |
| 676,366 | 6/1901 | Koch et al. .......................... 141/37 |
| 1,022,968 | 4/1912 | Neumayer ...................... 141/104 X |
| 1,981,611 | 11/1934 | Cappa ............................ 137/240 X |
| 2,537,119 | 1/1951 | Bauerlein et al. .................. 137/594 |
| 2,646,821 | 7/1953 | Johansson et al. . |
| 2,682,277 | 6/1954 | Marshall et al. . |
| 2,775,259 | 12/1956 | Stiebel . |
| 2,998,016 | 8/1961 | Bottenberg et al. ............ 137/110 X |
| 4,224,282 | 9/1980 | Steinert et al. ................. 422/131 X |
| 4,461,743 | 7/1984 | Chowdhury et al. ............. 422/129 |

FOREIGN PATENT DOCUMENTS 477211  6/1929  Fed. Rep. of Germany ...... 422/129

Primary Examiner—Stephen Hepperle
Attorney, Agent, or Firm—Alexander J. McKillop; Charles J. Speciale

[57] ABSTRACT

Two liquid comonomers are fed into a catalytic reactor through two separate concentric flow courses having pass through in a Tee-fitting connected to the reactor by a nipple. The two flow courses have spaced apart termination locations within the reactor and there is thereby avoided any possibility of commingling or cross-contamination of the two liquids at any time before they outflow within the reactor from their respective flow courses.

2 Claims, 1 Drawing Sheet

METHOD AND APPARATUS FOR SEGREGATED INTRODUCTION OF TWO LIQUIDS INTO A CHEMICAL REACTOR VESSEL AT A COMMON ENTRY POINT

BACKGROUND OF THE INVENTION

The present invention relates to the precise and segregated infeed of two liquids into a vessel at a common location on the vessel so that the liquids are at no time intermingled one with the other until they discharge within the vessel at infeed locations therein.

It is required in certain chemical processes that separate liquid stream feeds be supplied to a vessel at a common entry location and in manner that these liquids not intermingle during the delivery phase. Where the two liquids are to make feed entry into the vessel at a common location, it has been the practice in the past to communicate the two liquids through separate lines from sources thereof to a common header or manifold which header or manifold in turn was directly connected with the vessel. One of the problems associated with using separate lines which have juncture at a common manifold leading into the vessel is that cross-contamination of one liquid with the other can occur. In the case where the liquids are comonomers of hexene and butene, unintended first and second liquid intermingling could result in the altering of the characteristics of the liquids, or altering the intended volume of a given liquid which is to be employed in the reactor vessel for a particular reaction purpose and hence detrimentally effect the chemical process and/or chemical product to be produced.

Isolation of separate liquid supplies is, for example, disclosed in U.S. Pat. Nos. 2,646,821; 2,682,277 and 2,775,259. But in the devices described in these patents deliberate intermixing of the liquids occurs prior to the actual end point delivery of same for a particular purpose. U.S. Pat. No. 142,120 discloses delivery of separate fluids through separate conduits one of which is located interiorly of the other but it does not disclose that outflow from the two conduits be at separate end point locations if avoidance of cross contamination of one fluid with the other before end point use if such be a requirement incident the fluid handling.

It is desirable therefore that a simplified yet highly effective feed assembly for introducing two liquids in separate non-communicating flow courses into a pressure vessel at a common entry location be provided along with a method for doing this and so that intermixing of these liquids cannot occur as could result in consequent misproportionate delivery of liquid volumes than may be intended for a required purpose.

SUMMARY OF THE INVENTION

In accordance with the present invention, a feed assembly for introducing two liquids in respective separate noncommunicating infeed courses thereof into a pressure vessel at a common entry point or location on the vessel is provided by a Tee-fitting external of the vessel disposed at the common entry location. Most conveniently the entry will be at a flanged fitting on the reactor vessel, the fitting having an opening closed off by a plate, the plate as such being the member through which the interior of the vessel is accessed. The Tee-fitting which has two opposed sides and an intermediate side will have one of the opposed sides connected by means of a nipple which passes through the cover plate on the flange fitting to communicate the interior of the Tee-fitting with the vessel interior.

A first liquid supply line extending from a source of a first liquid such as a hexene stock is connected to the intermediate side of the Tee-fitting and that first liquid supply line communicates with the nipple interior through the Tee-fitting interior. A stop or blocking valve will intervene the source of the first liquid and the Tee-fitting. A second liquid supply line enters the Tee-fitting at the other opposed side thereof and passes through the Tee-fitting and the nipple codirectionally with the nipple. That second liquid supply line is isolated from the Tee-fitting interior and nipple interior and makes pass-through of the reactor flanged plate within the nipple to a termination location interiorally of the vessel with the second liquid supply line termination location being distant beyond that point at which the nipple terminates within the vessel. A stop or blocking valve will be provided in the second liquid supply line at a location upstream of the Tee-fitting between the stock of the second liquid and the Tee-fitting.

When it is desired to introduce a precise quantity of either liquid into the reactor vessel, the requisite quantity can be accumulated in the liquid source, the stop valve in the associated supply line opened and the liquid will flow from the source into the reactor vessel. Since the termination location of the second liquid supply line within the reactor vessel and that of the nipple are at locations interiorally of the inner surface of the vessel and since the termination locations of each are spaced apart, the liquid infeed from each will be directly into the interior space of the vessel without any spread against the inside surface of the reactor as was the case in the prior arrangement where the liquids entered the vessel at a nipple termination at the inner side of the flanged fitting cover plate.

The invention accordingly comprises the features of construction, combination of elements, arrangements of parts and steps in a dual liquid feed assembly and method for introduction of liquids to a pressure vessel which will be exemplified in the construction hereinafter set forth and the scope of the invention will be indicated in the claims.

BRIEF DESCRIPTION OF THE DRAWINGS

A fuller understanding of the nature and objects of the invention will be had from the following detailed description taken in conjunction with the accompanying drawings in which.

Throughout the following description like reference numerals are used to denote like parts in the drawings.

DESCRIPTION OF THE PREFERRED EMBODIMENTS

The present invention is concerned generally with the feeding of two liquids into the interior of a vessel at a common entry location by means of two supply lines which have a concentric relationship, that is one feed line is disposed centrally within a second larger feed line. The advantage of the foregoing is that it allows for the conveyance of the two liquids from stocks thereof in isolated flow courses to thereby preclude any cross contamination of one liquid with the other before the intended in-feed discharge of the liquid within the vessel. It also allows for more precise addition of certain quantities of the liquids, i.e., to the reaction occurring within a catalytic reactor than was possible when employing the prior means and devices used for such purposes.

The present invention is described herein in terms of its application for use in introducing separate feeds of comonomers of butene and hexene into a catalytic reactor. It will be understood however that the invention has wider use applicability wherever it is desired to introduce separate streams of liquid into a confined space without risk that the liquids will become prematurely commingled or cross contaminated one with the other.

Figure 1:
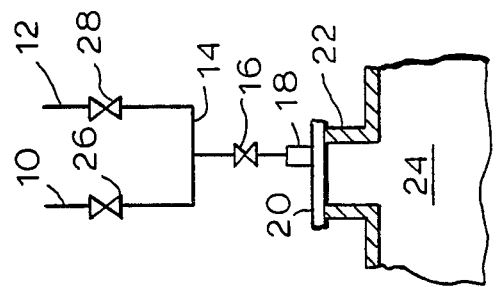
FIG. 1 is a schematic depiction of the prior arrangement by which two liquids are introduced into a reactor vessel.

FIG. 1 depicts a prior arrangement by which two liquids were introduced into a catalytic reactor. In that arrangement, separate sources of hexene and butene were connected by means of supply lines 10 and 12 with a common manifold 14 which in turn communicated via a stop valve 16, with in-feed nipple 18 connected in pass through of the cover 20 of a flanged fitting 22 on a reactor 24. When it was desired to feed liquids into the reactor, the respective stop valves 26 and 28 were opened and the two liquids flowed into the manifold 14 and thence via valve 16 and nipple 18 into the reactor, both liquids becoming at least for a short flow course run commingled. With termination of the nipple at the inside face of cover 20, the liquids where subject to spread at and onto that surface yielding less than the intended result of full quantity discharge directly within the interior of the reactor at the location proximal the reaction zone. With such arrangement, it was possible that inaccurate amounts of the liquids could be delivered to the reactor since one liquid could through the manifold, access at least part of the supply line of the other liquid and be mistakenly assumed to represent a quantity of the one liquid which in fact is not present for required reaction purposes.

Figure 2:
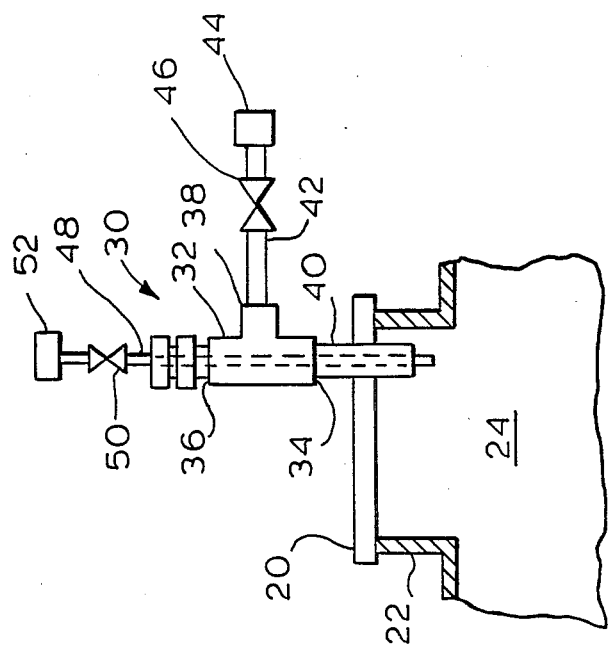
FIG. 2 is a schematic depiction of the manner in which the feed assembly of the present invention is connected to a pressure vessel for introducing two liquids in respective separate noncommunicating flow courses into the pressure vessel at a common entry location on the vessel.

With reference to FIG. 2 the feed assembly of the present invention shown generally at 30 comprises a Tee-fitting 32 having opposed sides 34 and 36 and an intermediate side 38. A first one of the opposed sides 34 is fitted with an elongated nipple 40 that passes through the flange cover 20 of flanged fitting 22 on reactor 24 and extends some distance inwardly of the reactor interior and thus communicates the interior of the nipple with the reactor interior. A first liquid supply line, for example, a high pressure tubing run 42 communicating with a suitable stock 44 of liquid, e.g., hexene is connected with the intermediate side of the nipple and a stop valve 46 intervenes the Tee-fitting and the hexene stock 44. An elongated tubular member or conduit 48 makes entry in tight sealed pass through to the Tee-fitting at the other opposed side 36 thereof and extends completely through the fitting and the nipple 40 generally concentrically of the nipple to a termination location inwardly of the vessel which is more distant inwardly than the termination location of the nipple. The other end of the conduit 48 extends via stop valve 50 to a stock 52 of a second liquid such as butene. Thus the second liquid supply conduit 48 is completely isolated from the first so that the respective two flow courses are the interior of the conduit 48 and the annular space surrounding that conduit and defined by the nipple.

When it is desired to supply either one or both of the two liquids into the reactor vessel, the appropriate valves on the two lines will be opened and the liquids will flow into the reactor with the in feed discharge within the vessel being at different locations for each so that it will be seen no commingling of one liquid with the other or any cross contamination can occur before the liquids are delivered to the intended locations within the reactor.

While there is disclosed above only one embodiment of the present invention it will be appreciated that various modifications can be made thereto by those skilled in the art and yet remain within the scope of the inventive concept disclosed.

What is claimed is:

1. A method for introducing two chemically reactive monomer liquids into a polymer reactor vessel at a common entry location on said vessel and in manner as maintains said liquids segregated one from the other until they are at desired infeed locations interiorally of the vessel, said method comprising feeding one chemically reactive monomer liquid through a central flow course and the other chemically reactive monomer liquid in a flow course encircling the first flow course, said feeding being carried out so that said chemically reactive monomer liquid flowing through said central flow course is not allowed to flow into and commingle with said flow course encircling said first flow course, and terminating the central flow course more interiorly of the vessel than the encircling flow course whereby the one chemically reactive monomer liquid infeeds to the vessel interior at a location removed from that at which the other chemically reactive monomer liquid infeeds.

2. The method of claim 1 in which the two chemically reactive monomer liquids are comonomers of hexene and butene.

* * * * *